Aug. 23, 1955 B. ROESSLER 2,716,031
HAND OPERATED BRAKE FOR WHEELBARROW
Filed Feb. 27, 1953
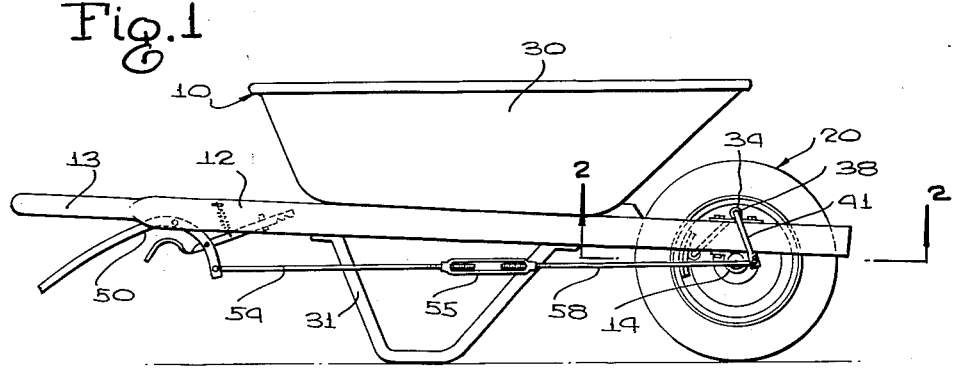
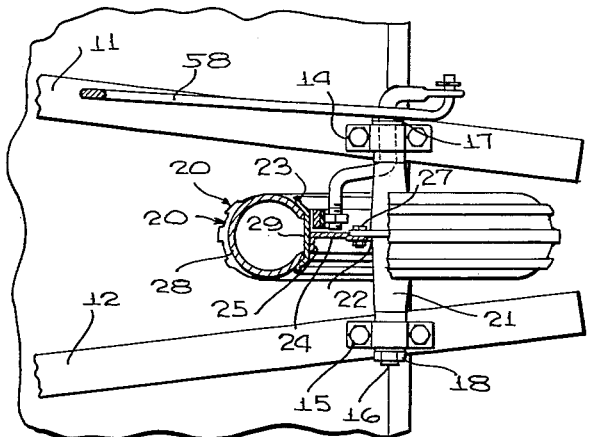
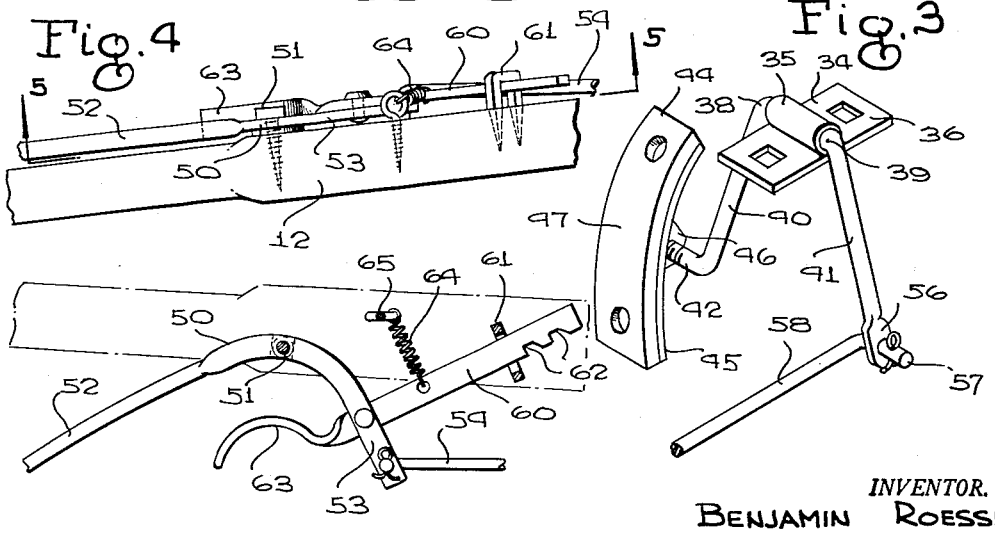
*INVENTOR.*
BENJAMIN ROESSLER
BY
McMorrow, Berman & Davidson
ATTORNEYS

United States Patent Office 2,716,031
Patented Aug. 23, 1955

2,716,031

HAND OPERATED BRAKE FOR WHEELBARROW

Benjamin Roessler, Cincinnati, Ohio

Application February 27, 1953, Serial No. 339,307

2 Claims. (Cl. 280—47.31)

This invention relates to hand operated brakes for wheelbarrows and more particularly to a hand brake attachment for a wheelbarrow having wooden shafts and a pneumatic tired wheel.

It is among the objects of the invention to provide an improved hand brake attachment which can be easily mounted on a wheelbarrow with no material modification of the wheelbarrow construction and operated by one hand of a person using the wheelbarrow to apply a braking action to the wheel of the wheelbarrow; which is particularly adapted for use with a wheelbarrow having a metal wheel provided with a pneumatic tire; which includes manually releasable means for locking the brake in wheel braking position; which is adjustable for wear and for variations in the dimensions of wheelbarrows to which the brakes are applied; and which is simple and durable in construction, economical to manufacture, easy to install, and positive and effective in operation.

Other objects and advantages will become apparent from a consideration of the following description and the appended claims in conjunction with the accompanying drawing, wherein:

Figure 1 is a side elevational view of a wheelbarrow with a hand brake attachment illustrative of the invention operatively mounted thereon;

Figure 2 is a fragmentary cross sectional view on the line 2—2 of Figure 1;

Figure 3 is a perspective view of a fragmentary portion of the brake attachment;

Figure 4 is a top plan view of a different portion of the brake attachment from that fragmentarily illustrated in Figure 3; and Figure 5 is a cross sectional view on the line 5—5 of Figure 4.

With continued reference to the drawing, the wheelbarrow, generally indicated at 10, is of known construction and comprises a pair of wooden shafts 11 and 12 disposed in spaced converging relationship. The shafts terminate in handles, as indicated at 13 for the shaft 12, at the divergent ends, and axle clips or brackets 14 and 15 are mounted on the undersides of shafts 11 and 12 respectively near the convergent ends.

An axle 16 is secured at its ends in the clamp brackets 14 and 15 and secured against longitudinal movement relative to the clamp brackets are suitable means, such as the nuts 17 and 18 threaded onto the opposite ends of the axle and bearing against the outer side of the clamp brackets 14 and 15 and a wheel, generally indicated at 20, is journaled on the axle 16 between the shafts 11 and 12. The wheel comprises an elongated hub 21 which surrounds the axle between the brackets 14 and 15, and has an annular flange 22 extending therearound and projecting radially therefrom at the midlength location thereof, a tire rim 23 circumspatially surrounding the flange 22 and a wheel web 24 of annular shape joined around its outer edge to the tire rim 23 by a flange 25 extending perpendicularly from the web at the outer edge thereof and connected to the flange 22 by suitable means, such as the flange bolts 27. A pneumatic tire 28 surrounds and is mounted on the tire rim 23 in a manner well known to the art and the inner surface of the tire rim 23 provides at one side of the web 24 a cylindrical surface 29 which is coaxial with the axis of rotation of the wheel.

A pan 30 of well known shape and construction is mounted on the shafts 11 and 12, intermediate the length of the shafts and legs, as indicated at 31, extend downwardly one from each of the shafts 11 and 12 below the pan 30 to support the pan when the legs are rested on the ground.

As wheelbarrows of the character illustrated are old and well known to the art, a more detailed illustration and description is considered unnecessary for the purposes of the present disclosure.

The brake attachment of the present invention comprises a bearing structure 34 mounted on the upper side of the shaft 12 substantially over the axle clamp bracket 14 mounted on the underside of this shaft, the shaft being of rectangular and preferably square cross sectional shape, except for the handle formation 13 at the end thereof remote from the wheel 20.

The bearing structure 34 comprises a cylindrical bearing sleeve 35 and flat plate 36 secured intermediate its length to the bearing sleeve and provided at respectively opposite sides of the bearing sleeve with apertures receiving bolts which extend through the shaft 12 to secure the bearing structure rigidly to the shaft of the bearing sleeve 35 disposed above and extending transversely of the shaft. A crank 38 has an arbor portion 39 journaled in the bearing sleeve 35 and arms 40 and 41 extending angularly one from each end of the arbor portion 39 and disposed almost perpendicular to the arbor portion but diverging to a limited extent in a direction away from the arbor portion. The arms 40 and 41 are rotationally displaced from each other by a small angle and the arm 40 has at its distal end an end portion 42 extending perpendicularly outwardly from the remainder of the arm and externally screw threaded at its outer end. A brake shoe 44 is carried by the crank arm 40 and comprises a shoe plate 45 of elongated, rectangular shape arcuately curved longitudinally thereof, a nut 46 secured to the plate 45 at the midlength location of the concave side of this plate and receiving the screw threaded end portion 42 of the arm 40, and a lining 47 of friction material secured on the convex side of the shoe plate 45. The brake shoe is disposed adjacent the cylindrical surface 29 of the wheel 20 and the lining 47 is engageable with the adjacent cylindrical surface of the wheel to apply a braking action to the wheen when the crank 38 is turned in the bearing 35 in the direction to move the brake shoe toward the adjacent surface of the wheel.

A bell crank lever 50 is pivotally secured at its angle to the shaft 12 near the handle portion 13 of the shaft by a pivot bolt 51 and one leg 52 of this bell crank lever extends along and diverges from the handle 13 to provide a hand lever for applying the brake. The other leg 53 of the bell crank lever is provided near its distal end with an aperture pivotally receiving the angularly disposed end portion of a rod 54 the other end of which is screw threaded and received in one end of a turn buckle 55. The arm 41 of the crank 38 is provided at its distal end with a flattened portion 56 having an aperture therein receiving the angularly disposed end portion 57 of a rod 58 the other end of which rod is screw threaded and received in the other end of the turn buckle 55 so that the rods 54 and 58 and the turn buckle 55 together constitute an adjustable length link connecting the bell crank lever 50 to the arm 41 of the crank 38. Both arms 40 and 41 of the crank depend downwardly from the bearing sleeve 35 mounted on the upper side of the shaft 12 and the distal end of the arm 40 of the crank carrying the brake shoe 44 is disposed somewhat nearer the adjacent end of the wheelbarrow pan 30 than is the distal end of the arm 41 so that a pull on the distal end of the arm 41 toward the handle end of the associated shaft forces the brake shoe 44 against the cylindrical surface 29 of the wheel 20 at the side of this cylindrical surface nearest the adjacent end of the pan 30.

A latch bar 60 is pivotally connected to the arm 53 of the bell crank lever 50 between the pivotal connection of the rod 54 with this leg of the bell crank lever and the pivot bolt 51 and this arm extends from the bell crank lever toward the adjacent end of the pan 30 and through a staple 61 secured to the shaft 12 and projecting from the inner side of the shaft. The latch bar 60 is provided near its end adjacent the staple 61 with notches 62 which are engageable with the staple to hold the bell crank lever 50 in brake-applying position. A handle 63 is provided on the other end of the latch bar and a tension spring 64 is connected at one end to the latch bar between the bell crank lever leg 53 and the staple 61 and at its other end to a screw eye 65 mounted on the wheelbarrow shaft 12.

When the hand lever 52 is moved to apply the brake to the wheel 20, an upward pull on the handle 63 of the latch bar will engage one of the notches 62 of the latch bar with staple 61 to lock the mechanism in brake-engaging condition. In order to release the brake the hand lever 52 is first moved further in a brake-engaging direction releasing the latch bar from the staple and permitting the spring 64 to lift the latch bar to a position at which it will not engage the staple and the hand lever 52 may then be released to release the brake after which the wheelbarrow may be moved. When it is desired to apply the brake while the wheelbarrow is in motion, it is necessary only to pull upwardly on the hand lever 52 as this movement of the hand lever forces the brake shoe into braking engagement with the associated cylindrical surface of the wheel 20.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a wheelbarrow having spaced apart shafts arranged in converging relationship each terminating in a handle at the divergent end thereof, brackets mounted one on each shaft at the convergent ends of said shafts, an axle secured at its respectively opposite ends to said bracket and extending between said shafts, and a wheel journaled on said axle between said shafts and having thereon a cylindrical surface coaxial with the axis of rotation of the wheel, brake mechanism comprising a bearing structure mounted on one of said shafts adjacent the corresponding bracket, a crank having an arbor portion journaled in said bearing structure and arms extending angularly one from each end of said arbor portion, a brake shoe mounted on the distal end of one of said arms and positioned adjacent the cylindrical surface on said wheel for braking engagement therewith, a bell crank lever pivotally mounted at its angle on said one shaft adjacent the handle end of the latter and having one leg thereof extending along the handle portion of said one shaft to constitute a brake-applying hand lever, an adjustable length link connecting the distal end of the other leg of said bell crank lever to the distal end of the other arm of said crank to enable said bell crank lever to turn said crank in a brake-applying direction when the hand lever leg of said bell crank lever is manually moved toward the adjacent shaft handle, an abutment device mounted on said one shaft adjacent said bell crank lever, and a latch bar pivotally connected to said bell crank lever and having notches therein engageable with said abutment device to releasably lock said bell crank lever in its brake-applying position relative to said one shaft.

2. In combination with a wheelbarrow having spaced apart shafts arranged in converging relationship each terminating in a handle at the divergent end thereof, brackets mounted one on each shaft at the convergent ends of said shafts, an axle secured at its respectively opposite ends to said bracket and extending between said shafts, and a wheel journaled on said axle between said shafts and having thereon a cylindrical surface coaxial with the axis of rotation of the wheel, brake mechanism comprising a bearing structure mounted on one of said shafts adjacent the corresponding bracket, a crank having an arbor portion journaled in said bearing structure and arms extending angularly one from each end of said arbor portion, a brake shoe mounted on the distal end of one of said arms and positioned adjacent the cylindrical surface on said wheel for braking engagement therewith, a bell crank lever pivotally mounted at its angle on said one shaft adjacent the handle end of the latter and having one leg thereof extending along the handle portion of said one shaft to constitute a brake-applying hand lever, and an adjustable length link connecting the distal end of the other leg of said bell crank lever to the distal end of the other arm of said crank to enable said bell crank lever to turn said crank in a brake-applying direction when the hand lever leg of said bell crank lever is manually moved toward the adjacent shaft handle, said wheel having a tire rim for a pneumatic tire and said cylindrical wheel surface comprising a portion of the inner surface of said tire rim.

References Cited in the file of this patent

UNITED STATES PATENTS

| 108,341   | Ennis   | Oct. 18, 1870 |
| 391,554   | Parker  | Oct. 23, 1888 |
| 1,363,910 | Parker  | Dec. 28, 1920 |
| 1,811,394 | Hornsby | June 23, 1931 |